United States Patent Office 2,887,661
Patented May 19, 1959

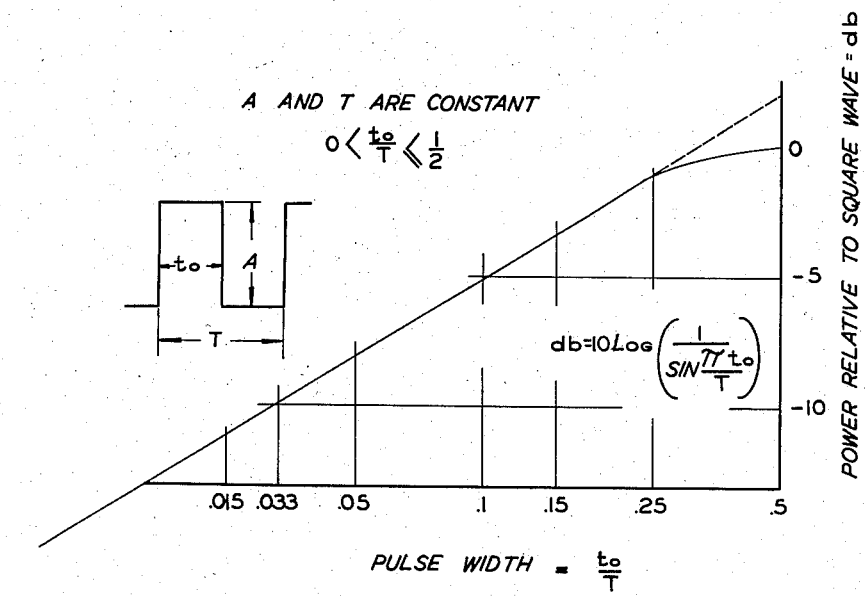
FIG_1

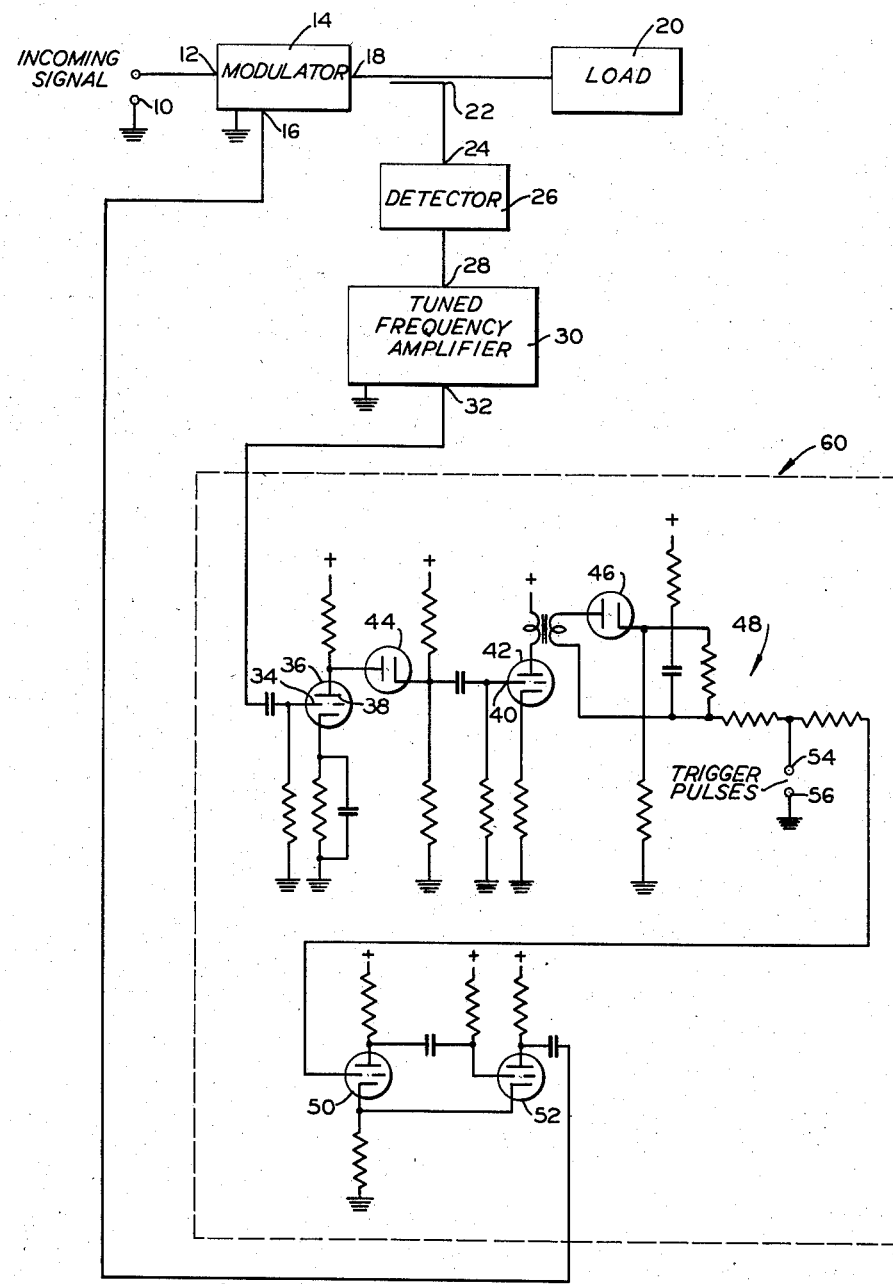

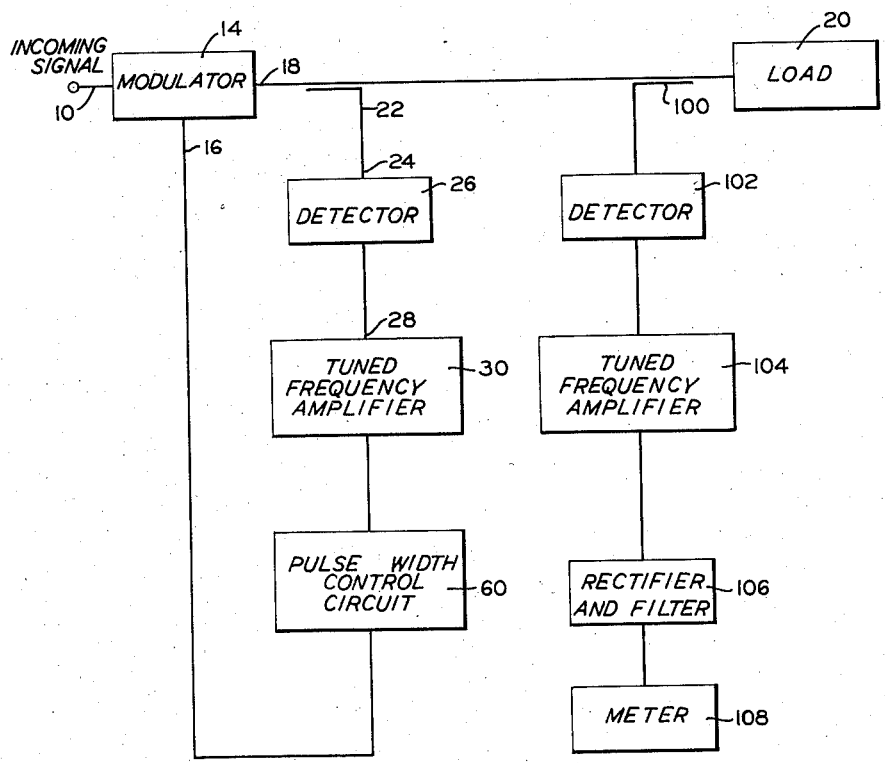

2,887,661

MICROWAVE TEST SYSTEM

Dale C. Brocker, Sunnyvale, Calif., assignor to Sylvania Electric Products Inc., a corporation of Massachusetts Application November 30, 1955, Serial No. 549,939

1 Claim. (Cl. 332—9)

The present invention relates to microwave frequency signal generators characterized by a constant output power lever over a wide frequency range and more particularly relates to microwave test equipment utilized in transmission line measurements.

As is well known in the art, when a transmission element such as a transmission line, is terminated at one end in an impedance differing from its characteristics impedance and an alternating current wave is supplied to the other end, it will be observed that a portion of the energy arriving at the terminated end is reflected back to the source.

The relation at any point along the line between the incident energy and that reflected may be expressed by the relationship $$|\Gamma| = \frac{E_r}{E_i} = \sqrt{\frac{P_r}{P_i}}$$

where $\Gamma$ is the reflection coefficient
$P_i$ is the incident power
$P_r$ is the reflected power
$E_i$ is the voltage of the incident wave
$E_r$ is the voltage of the reflected wave.

Another effect which may be observed on the transmission line is the presence of standing waves due to the vectorial addition of the incident and the reflected wave at each point along the line. The relative phases of both waves vary from point to point along the line so that voltage maxima and minima may be detected. The ratio between the incident and reflected voltages so detected is commonly called the voltage standing ratio (VSWR) and is expressed as $$VSWR = \frac{E_i + E_r}{E_i - E_r}$$

where the quantities in the equation correspond to those identified above.

Further, the reflection coefficient is related to the voltage standing wave ratio VSWR as follows:

$$VSWR = \frac{1 + |\Gamma|}{1 - |\Gamma|}$$

Consequently, a device which measures either the reflection coefficient or the VSWR can be directly calibrated in terms of VSWR or $|\Gamma|$.

It will thus be seen that measurement of either the reflection coefficient or the VSWR provides a measure of impedance mismatch between the transmission line and the load.

A well known method of measuring VSWR involves the use of a slotted line and a movable probe by means of which voltage maxima and minima across the line may be detected and measured. However, this method is inherently time consuming and becomes cumbersome for measurements in which the frequency of the source is varied over a wide band of frequencies.

A method of investigating the reflection coefficient involves supplying alternating current energy to the line, separating the incident power from the reflected power, and determining the ratio of these powers. This may be done by coupling two directional couplers to the line, one coupler being responsive only to incident power, the other coupler being responsive only to reflected power. When the coupling factors of both couplers are known, and detectors of known characteristics are connected thereto, the reflection coefficient can be calculated directly. In this method, it is often desirable to use an alternating signal modulated at a known frequency as a source of input energy, and to use amplifiers coupled between each of the detectors and its associated measuring instrument and tuned to respond only to this known frequency.

The output from both detectors can be combined in a ratio meter. In this situation, when the detectors are of the square law type, the ratiometer may be directly calibrated in terms of the reflection coefficient. Further details on the system can be found for example in Transactions of the IRE PGI—3 April 1954.

It will be apparent that the reflectometer method just described is both faster and simpler in operation as compared to the slotted line method. Further, the reflectometer method can give a continuous indication of mismatch in terms of either the reflection coefficient or voltage standing wave ratio, as the carrier frequency is varied. Moreover, the output of the ratiometer may be connected to a recording device such as an oscilloscope, and a continuous presentation of $|\Gamma|$ or VSWR plotted against frequency can be made as the frequency of the source is varied over a wide range.

It is known that the power output of an alternating current source (particularly at microwave frequencies) tends to vary widely as its frequency varies. If the power output could be held constant, use of the reflectometer method would permit $|\Gamma|$ or VSWR information to be read directly from a single instrument appropriately calibrated and coupled to the detector responsive only to reflected power; it would no longer be necessary to continuously measure the incident power and, further, to measure the power ratio.

However, while several methods for maintaining the power output of variable frequency signal generators at a constant level are known, all such methods suffer from certain serious disadvantages. For example, some of these methods are operative only over a narrow frequency range, while other methods have an inherent rate of response which is too slow for high frequency applications.

My invention obviates these disadvantages and provides apparatus for producing an output signal having a constant power level over an extended frequency range. Such apparatus can be used, for example, in measuring the field pattern of an antenna at various frequencies or in attenuation measurements on transmission lines.

Accordingly it is an object of the present invention to provide a transmission line measurement device which may be used with conventional variable frequency signal generators.

Another object of the present invention is to simplify the measurement of transmission line characteristics over a wide band of frequencies.

Still another object of the present invention is to provide a new and improved apparatus adapted to control the power output of microwave signal generators in such manner that the output can be held constant as the generator frequency is varied.

A further object of the present invention is to provide for the improvement of VSWR measurements upon transmission line by maintaining the incident component of modulated power into such line substantially constant at all microwave frequencies under consideration.

Still a further object of the present invention is the continuous measurement of VSWR over a wide range of frequencies.

Yet a further object is to provide a radio frequency generator device characterized by a constant output power component over a wide range of frequencies.

These and other objects will either be explained or will become apparent hereafter.

My invention is based in part upon the recognition that the fundamental frequency component of recurrent electrical pulses having a fixed repetition rate and variable width has an average amplitude which is a function of both the pulse width and the peak pulse amplitude. Therefore, variations in pulse amplitude or width can cause the power content to vary. However, if the peak pulse amplitude changes, for example decreases, the average power content of the fundamental component can be maintained constant by varying the pulse width in an appropriate manner, for example, by increasing the pulse width. The principal limitation in this procedure is that the pulse width cannot be increased beyond that equivalent to one half cycle of the modulation frequency.

In one embodiment of my invention, a continuous microwave signal having a frequency which can be varied at will is pulse modulated by equidistantly spaced pulses having a given recurrence frequency; the pulse modulated signal is supplied to a transmission line terminated in a load. Means responsive to variations in the fundamental frequency power component of the modulated signal vary the pulse widths of the modulation pulses in a direction at which this power level is held substantially constant despite changes in amplitude levels produced by the signal source during changes in the signal frequency. As a result, VSWR or the reflection coefficient of the load can be measured by devices solely responsive to the reflected power.

Illustrative embodiments of my invention will now be described with reference to the accompanying drawings, wherein:

Figure 1 is a graph showing the relationship for a rectangularly shaped pulse between pulse width and the power level of the fundamental frequency component carried by the pulse:

Figure 2 illustrates one embodiment of my invention; and

Figure 3 illustrates a second embodiment of my invention.

When a pulse contained within a pulse train of given recurrence frequency and having a variable width which can range between 0 and one half cycle (or $\pi$ radians) is harmonically analyzed, it will be found that the amplitude of the fundamental frequency component is proportional to the quantity $\sin \theta/2$ where $\theta$ is the pulse width expressed in radians. Stated non-mathematically, the amplitude of this fundamental component is a function of the pulse width. In fact, for values of $\theta$ less than $\pi/4$, the amplitude of the fundamental component varies directly with pulse width. Further, since the recurrence frequency is fixed, the power contained in the fundamental component will increase or decrease, as the amplitude of the fundamental component is increased or decreased and consequently, the power level of this component also varies directly with the pulse amplitude.

Figure 1 shows these relationships in the form of a semi-logarithmic graph. The pulse to be analyzed has a width T0 and a period T. The width T0 can range between 0 and $T/2$ or expressed differently the ratio $T0/T$ can range between 0 and ½. The ratio is plotted as the abscissa.

The power level of the fundamental frequency component of the pulse is plotted as the ordinate, the maximum power level being taken as 0. Thus the power level can be adjusted to any desired value within the ranges indicated. Within these limits, any variation in power level can be corrected by varying the pulse width in the manner indicated in Figure 1.

Referring now to Figure 2, a sinusoidal signal having a predetermined frequency falling within the radio frequency range appears at a terminal 10 and is supplied to an input 12 of modulator 14. A train of pulses produced in a manner described hereinafter is supplied to an input 16 of modulator 14. As a result, a pulse modulated signal having a carrier frequency equal to said predetermined frequency is produced at the output 18 of modulator 14 and is supplied to the load 20.

Alternatively, the modulator 14 may be incorporated into the radio frequency signal source. For example, a klystron can be used to produce the signal, and the modulation pulses can be supplied to the klystron to cause the klystron itself to produce the modulated signal. Of course, there are many other will known arrangements for producing a modulated signal of this type.

This pulse modulated signal is also fed through directional coupler 22 (which responds only to incident power) to the input 24 of detector 26. Detector 26 for example can be a bolometer or can be of the crystal type. The detected envelope of the modulated signal is supplied to the input 28 of amplifier 30. Amplifier 30 is a tuned amplifier adapted to pass and amplify linearly the fundamental frequency of the modulated signal and, at the same time, prevent passage of any harmonics of this frequency. Alternatively, amplifier 30 can be tuned to a harmonic, for example the second harmonic, of the modulated signal to control that particular harmonic component of the modulated signal. The frequency component which appears at the output 32 of amplifier 30 is supplied to the grid 34 of tube 36. Interposed between the anode 38 of the tube 36 and the grid 40 of tube 42 is a suitably biased diode 44.

As soon as the amplifier component yielded at the anode of tube 36 attains a value in excess of the bias on diode 44, diode 44 conducts and passes the excess component through amplifier 42 to diode 46. Diode 46 rectifies this component, and after the rectified component is filtered in network 48, the resulting variable negative D.C. voltage is supplied to control the grid bias on tube 50. Tube 50 and 52 together comprise a monovibrator; tube 52 is normally conducting, but when periodically rendered momentarily non-conductive, produces output pulses. These pulses are supplied to the modulator and form the modulation pulse train referred to previously.

Equidistantly spaced trigger pulses are applied between terminals 54 and 56 to render tube 50 periodically conductive, thus rendering tube 52 non-conductive and generating the desired positive output pulses. The grid bias voltage supplied to tube 50 determines the length of the period in which tube 50 conducts and thus determines the width of the output pulses; for example, as this bias voltage becomes more negative, tube 50 conducts for a shorter period and the width of the resulting output pulse is decreased.

Thus, if the output level of the generator increases over a selected reference value, the amplitude of the fundamental frequency component will increase, the grid bias voltage on tube 50 becomes more negative, the width of the output pulse is decreased, and the output power level is restored to its reference value.

Similarly, if the output power level decreases, the amplitude of the fundamental components of the pulse will decrease, the grid bias voltage becomes less negative, the width of the output pulse is increased and again the output power level is restored to its reference value.

This arrangement can be used in VSWR measurements in the manner indicated in Figure 3. With the power level held constant in the manner previously described with reference to Figure 2, the incident power is fed from the generator output 18 through the main arm of the directional coupler 22 and a portion of this power is reflected from the load and returns toward the generator. A sample of this reflected power is taken from the side arm of directional couple 100 (which is responsive only to the reflected power) and fed to detector 102, amplifier 104, rectifier and filter 106, and meter 108. With a load of known VSWR or reflection coefficient attached, for example an open or short circuit, the gain of amplifier 104 is adjusted so that the reading on meter 108 corresponds to the VSWR or reflection coefficient of the known load. When the known load is removed and the unknown load attached, VSWR or reflection coefficient measurements can then be taken at 108 as required.

While I have shown and pointed out and described my invention in one preferred embodiment, it will be apparent to those skilled in the art that many modifications can be made within the scope and sphere of my invention as defined in the claim which follows:

What I claim is:

Apparatus for controlling the power output of a variable frequency microwave generator susceptible to variations in amplitude with changes in frequency comprising, a source of equally spaced trigger pulses, a monovibrator rectangular pulse generating circuit synchronized in frequency by said trigger pulses, the time duration of said rectangular pulses being proportional to a direct current control voltage, means coupling the output of said monovibrator to said microwave generator for modulating said generator to provide a pulse modulated microwave signal having an amplitude dependent on the amplitude of the microwave signal, a detector coupled to the output of said microwave generator for detecting the rectangular wave modulating signal, a tuned amplifier coupled to the output of said detector for selectively amplifying the fundamental of the detected rectangular wave signal, a source of direct current reference voltage, means including a diode for comparing the output of said tuned amplifier with said reference voltage operative to produce a series of pulses of a magnitude proportional to the amount the magnitude of the output of said tuned amplifier exceeds said direct current reference voltage, means for rectifying said series of pulses to produce a direct current error voltage proportional to the amount the magnitude of the output of said tuned amplifier exceeds said direct current reference voltage, the output of said rectifying means being applied to said monovibrator for varying the time duration of the monovibrator output pulses to maintain the error voltage at a minimum.

References Cited in the file of this patent

UNITED STATES PATENTS

| | | |
|---|---|---|
| 2,510,054 | Alexander et al. | June 6, 1950 |
| 2,786,180 | Cohn | Mar. 19, 1957 |